United States Patent [19]

Dormish et al.

[11] Patent Number: 5,039,733

[45] Date of Patent: Aug. 13, 1991

[54] PROCESS FOR THE PREPARATION OF AQUEOUS POLYURETHANE-POLYUREA DISPERSION

[75] Inventors: Jeffrey Dormish, Pittsburgh, Pa.; Wolfgang Henning, Kuerten, Fed. Rep. of Germany

[73] Assignee: Bayer Aktiengesellschaft, Bayerwerk, Fed. Rep. of Germany

[21] Appl. No.: 416,290

[22] Filed: Oct. 2, 1989

Related U.S. Application Data

[63] Continuation-in-part of Ser. No. 258,230, Oct. 14, 1988, Pat. No. 4,871,798.

[30] Foreign Application Priority Data

Oct. 21, 1987 [DE] Fed. Rep. of Germany ....... 3735587

[51] Int. Cl.$^5$ .............................................. C08L 75/00
[52] U.S. Cl. .................................... 524/591; 524/839; 524/840
[58] Field of Search ........................ 524/591, 839, 840

[56] References Cited

U.S. PATENT DOCUMENTS

| | | | |
|---|---|---|---|
| 4,108,814 | 8/1978 | Reiff et al. | 260/29.2 |
| 4,110,284 | 8/1978 | Violland et al. | 260/29.2 |
| 4,652,466 | 3/1987 | Thomas et al. | 427/244 |

FOREIGN PATENT DOCUMENTS 3633421 7/1987 Fed. Rep. of Germany.

*Primary Examiner*—Maurice J. Welsh
*Attorney, Agent, or Firm*—Joseph C. Gil; Thomas W. Roy

[57] ABSTRACT

The present invention is directed to a process for the preparation of stable polyurethane-polyurea dispersion in a multi-stage process by forming an isocyanate-terminated prepolymer having an ionic group content of up to about 50 milliequivalents per 100 g of prepolymer by reacting an organic polyisocyanate a) with at least two isocyanate-reactive components b1) and b2) wherein component (b1) has at least one ionic or potential ionic hydrophilic group, characterized in that 1) The isocyanate a) is initialy reacted with component b1) for a time sufficient to react at least 50% of the isocyanate-reaction groups of component (b1), and 2) the resulting product is then reacted with component b2) and optionally with a component b3) containing ethylene oxide units to form a prepolymer, and 3) the resulting prepolymer is dispersed in water.

The present invention further relates to products obtained according to this process and to their use for the preparation of coatings on flexible or rigid substrates and in particular to their use as adhesives.

19 Claims, No Drawings

PROCESS FOR THE PREPARATION OF AQUEOUS POLYURETHANE-POLYUREA DISPERSION

This application is a Continuation-in-Part of U.S application, Ser. No. 07/258,230, filed Oct. 14, 1988 now U.S. Pat. No. 4,871,798.

BACKGROUND OF THE INVENTION

1. Field of the Invention

This invention relates to a process for the preparation of stable aqueous dispersions of polyurethane-polyureas, to the dispersions obtained and to their use for the production of coatings.

2. Description of the Prior Art

Polyurethane-polyureas have numerous commercial applications, for example as adhesives or coating compounds for various substrates such as textiles, plastics, wood, glass fibers, leather and metals. Chemical resistance, abrasion resistance, toughness, tensile strength, elasticity and durability are some of the possible properties of these materials.

It is known in the art that polyurethane- polyureas may be applied as coating compounds or adhesives from solutions in organic solvents. This is economically disadvantageous due to the high cost of the solvents, but even more important is the atmospheric pollution caused by the solvents.

Numerous experiments have therefore been undertaken to produce polyurethane-polyurea coatings from dispersions of these polymers in water. This procedure is economical since water is used as solvent and causes no atmospheric pollution. Polyurethane- polyureas are, however, incompatible with water, i.e. they do not form stable dispersions in water unless they are produced by special manufacturing processes or with the aid of special additives.

In earlier methods for the preparation of stable dispersions of polyurethane-polyureas, external emulsifiers were used for dispersing and stabilizing the polymers in water, example as described in U.S. Pat. No. 2,968,575. Although dispersions could be prepared by this method, the coatings obtained had serious disadvantages, for example a high sensitivity to water due to the presence of these emulsifiers.

In subsequent developments, emulsifiers which could be chemically incorporated in the polyurethane-polyurea chain were used. Such ionic emulsifiers are described, for example, in U.S. Pat. No. 3,479,310. The use of chemically incorporated nonionic emulsifiers is described, for example, in U.S. Pat. No.3,905,929, U.S. Pat. No. 3,920,598 and U.S. Pat. No. 4,190,566. Further improvements in the properties of coatings obtained from polyurethane-polyurea dispersions were achieved by the combination of ionic and nonionic starting components, as described, for example, in U.S. Pat. No. 4,092,286, U.S. Pat. No. 4,237,264 and U.S. Pat. No. 4,238,378.

These developments led to dispersions with improved stability and lower proportions of hydrophilic starting components. Since these dispersions contained a lower proportion of hydrophilic starting components, they could be used for the formation of coatings with improved water resistance and less loss of mechanical strength in the swelled state. The preparation of polyurethane-polyurea dispersions obtained by dispersing prepolymers containing isocyanate end groups in water and then chain lengthening with diamines is described in U.S. Pat. No. 4,066,591. The prepolymers containing ionic groups mentioned in U.S. Pat. No. 4,066,591 are obtained by a simple method of reacting an excess of isocyanate groups with starting components containing isocyanate-reactive groups and ionic or potentially ionic groups until the theoretical amount of free isocyanate groups are obtained. No particular sequence of reactions of the starting components is described. U.S. Pat. No. 4,408,008 also describes the preparation of prepolymers containing isocyanate groups followed by dispersion in water. In this case the prepolymers are prepared from organic polyisocyanates, compounds containing at least two isocyanate-reactive groups, organic compounds containing hydrophilic ethylene oxide units and optionally organic compounds containing ionic or potential ionic groups.

Dispersions of tertiary amine salts of polyurethaneureas prepared from polyamines such as triamines and urethane prepolymers containing isocyanate end groups and carboxyl groups are described in U.S. Pat. No. 4,203,883. In accordance with this invention, the isocyanate-terminated prepolymers may be prepared by the reaction of isocyanates and polyols in a simultaneous or a stepwise process. The said disclosure does not mention that the stepwise method of reaction has any particular influence on the properties of the resulting dispersions.

Cross-linked polyurethane dispersions obtained from isocyanate-terminated prepolymers containing carboxylate groups are described in U.S. Pat. No. 4,554,308. Examples are given in which the carboxyl groups are incorporated in the prepolymer in the second step of a stepwise reaction sequence. Here again, there is no mention of the reaction method having any particular influence on the properties.

One disadvantage of the known polyurethane-polyurea dispersions is that a relatively large quantity of ionic groups must be incorporated if good dispersibility is to be achieved.

It is an object of the present invention to provide an improved process for the preparation of polyurethane-polyurea dispersions in which the quantity of ionic groups required for dispersion is reduced without sacrificing the other desirable properties of coatings or films prepared from these dispersions.

SUMMARY OF THE INVENTION

The present invention is directed to a process for the preparation of stable polyurethane-polyurea dispersions in a multi-stage process by forming an isocyanate-terminated prepolymer having an ionic group content of up to about 50 milliequivalents per 100 g of prepolymer by reacting an organic polyisocyanate a) with at least two isocyanate-reactive components b1) and b2) wherein component b1) has at least one ionic or potential ionic hydrophilic group, characterized in that 1) the isocyanate a) is initially reacted with component b1) for a time sufficient to react at least 50% of the isocyanate-reactive groups of component b1), and
2) the resulting product is then reacted with component b2) and optionally with a component b3) containing ethylene oxide units to form a prepolymer, and
3) the resulting prepolymer is dispersed in water.

The present invention further relates to products obtained according to this process and to their use for the preparation of coatings on flexible or rigid substrates and in particular to their use as adhesives.

DETAILED DESCRIPTION OF THE INVENTION

In a preferred embodiment, an isocyanate excess is employed during the whole process of preparation. In another preferred embodiment, the prepolymers are straight chain prepolymers with a molecular weight of up to about 25,000. In another preferred embodiment, the prepolymer is reacted with a chain lengthening agent during or after dispersion in water. In a particularly preferred embodiment, compound b2) is a compound with a molecular weight of at least about 1500.

The process according to the invention gives rise to dispersions which are more stable and more finely divided for a given ionic group content in the prepolymer than those obtained by known processes. In many cases, finely divided, stable dispersions are obtained with a given ionic group content when only unstable and sedimenting products can be obtained with such an ionic group content by the known processes.

The process according to the invention enables dispersions with a given average particle size to be produced from smaller quantities of ions than are required in the prior art processes. By using smaller quantities of hydrophilic groups, the present invention enables coatings and adhesives to be prepared with a lower tendency to water absorption and hence with less impairment in the mechanical properties resulting from the absorption of water. This constitutes a considerable advantage.

The following are examples of suitable starting components a) for the process according to the invention.

Diisocyanates of the formula $Q(NCO)_2$ in which Q denotes an aliphatic hydrocarbon group with 4 to 18 carbon atoms, a cycloaliphatic hydrocarbon group with 6 to 15 carbon atoms, an aromatic hydrocarbon group with 6 to 15 carbon atoms, or an araliphatic hydrocarbon group with 7 to 15 carbon atoms. Examples of these diisocyanates include tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexyl methane, 4,4'-diisocyanato-dicyclohexylpropane-(2,2), 1,4-diisocyanatobenzene, 2,4-diisocyanatotoluene, 2,6-diisocyanatotoluene, 4,4'-diisocyanatodiphenyl methane, 4,4'-diisocyanatodiphenyl propane-(2,2), p-xylylene diisocyanate, $\alpha,\alpha,\alpha',\alpha'$-tetramethyl-m- and -p-xylylene diisocyanate, and mixtures of the above mentioned compounds.

In the process according to the invention, it is also possible in principle to use the starting components a) exemplified above in combination with higher functional low molecular weight polyisocyanates such as the reaction product of 3 mol of 2,4-diisocyanatotoluene with 1 mol of trimethylolpropane and/or in combination with monofunctional isocyanates such as phenyl isocyanate, hexyl isocyanate or n-dodecyl isocyanate. It is also possible to use monofunctional isocyanates containing polyether chains with incorporated ethylene oxide units, for example of the type mentioned in U.S. Pat. Specifications No. 3,920,598 and 4,237,264, herein incorporated in their entireties.

When such monofunctional isocyanates are used, however, it is generally necessary to add higher than difunctional starting components to prevent premature chain breaking, especially when preparing high molecular weight polyurethanes. For the process according to the invention it is preferred to use difunctional isocyanates of the type exemplified above as starting component a).

Component b1) preferably includes compounds containing isocyanate-reactive groups with anionic groups or groups capable of conversion into anionic groups as described, for example, in U.S. Pat. Nos. 3,765,992, 3,479,310 or 4,108,814, herein incorporated by reference in their entireties.

Aliphatic diols containing sulphonate groups according to DT-OS 2,446,440 and DT-OS 2,437,218 are preferably used as anionic or potential anionic starting components b1) for the process according to the invention.

The particularly preferred (potential) ionic starting components contain sulphonate groups and include sulphonate diols corresponding to the formula

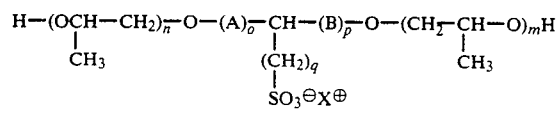

wherein
A and B stand for identical or different divalent aliphatic hydrocarbon groups containing 1 to 6 carbon atoms,
R stands for hydrogen, an aliphatic hydrocarbon group with 1 to 4 carbon atoms or a phenyl group,
$X^\oplus$ stands for an alkali metal cation or an optionally substituted ammonium group,
n and m stand for identical or different integers from 0 to 30,
o and p each represents 0 or 1 and
q stands for an integer from 0 to 2.

Propoxylated adducts of 2-butene diol-(1,4) and a sulphite, in particular $NaHSO_3$, wherein $n+m=4$, are examples of particularly preferred compounds b1). The compounds b1) are preferably used in solution, for example, in toluene.

Suitable starting components b2) for the process according to the invention include compounds containing at least two isocyanate-reactive groups, in particular organic compounds which contain a total of 2 amino groups, thiol groups, carboxyl groups and/or hydroxyl groups and have molecular weights of 61 to about 10,000, preferably 300 to about 6000, and most preferably about 1500 to 5000. The corresponding dihydroxyl compounds are preferably used. Small proportions of compounds which are trifunctional or higher functional in isocyanate polyaddition reactions, such as trimethylol propane, may be included for obtaining a certain degree of branching in the same way that trifunctional or higher functional polyisocyanates may be used for the same purpose, as already mentioned.

The preferred hydroxyl compounds are hydroxypolyesters, hydroxypolyethers, hydroxypolythioethers, hydroxypolyacetals, hydroxypolycarbonates and/or hydroxypolyester amides of the type known in polyurethane chemistry. Suitable hydroxypolyesters include, for example, the reaction products of polyhydric, preferably dihydric alcohols (with the optional addition of trihydric alcohols) and polybasic, preferably dibasic carboxylic acids. Instead of free polycarboxylic acids, the corresponding polycarboxylic acid anhydrides or corresponding polycarboxylic acid esters of lower alcohols or mixtures thereof may be used for the preparation of the polyesters. The polycarboxylic acids may be aliphatic, cycloaliphatic, aromatic and/or heterocyclic and may be substituted, e.g. with halogen atoms, and/or unsaturated. Examples include succinic acid, adipic acid, suberic acid, azelaic acid, sebasic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally together with monomeric fatty acids, dimethyl terephthalate, and terephthalic acid-bis-glycol ester. Examples of suitable polyhydric alcohols include ethylene glycol, propylene glycol-(1,2) and -(1,3), butylene glycol-(1,4) and -(2,3) and -(1,3), hexane diol-(1,6), octanediol-(1,8), neopentyl glycol, cyclohexane dimethanol (1,4-bishydroxymethyl cyclohexane), 2-methyl-1,3- propane diol, glycerol, trimethylol propane, hexane triol-(1,2,6), butane triol-(1,2,4), trimethylol ethane, pentaerythritol, quinitol, I5 mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain a proportion of carboxyl end groups. Polyesters of lactones such as ε-caprolactone or hydroxycarboxylic acids such as ω-hydroxycaproic acid may also be used.

The polyethers with preferably two hydroxyl groups which may be used are also of known type and may be prepared, for example, by the polymerization of epoxides such as ethylene oxide, propylene oxide, butylene oxide, tetrahydrofuran, styrene oxide or epichlorohydrin, either on their own, e.g. in the presence of $BF_3$, or by chemical addition of these epoxides, optionally as mixtures or successively, to starting components containing isocyanate-reactive groups such as alcohols or amines. Examples include the previously mentioned polyhydric alcohols and also water, ethylene glycol, propylene glycol-(1,3) or -(1,2), 4,4'- dihydroxy-diphenyl propane or aniline.

Polyethers modified with vinyl polymers such as the compounds obtained by the polymerization of styrene or acrylonitrile in the presence of polyethers (U.S. Pat. Specifications Nos. 3,383,351, 3,304,273, 3,523,093 and 3,110,695 and German Patent Specification 1,152,536) are also suitable. A portion of higher functional polyethers, which may optionally be added, are obtained analogously by the known process of alkoxylation of higher functional starting molecules such as ammonia, ethanolamine, ethylene diamine or sucrose.

Among the polythioethers should be particularly mentioned the products obtained by the condensation of thiodiglycol on its own and/or with other glycols, dicarboxylic acids, formaldehyde, amino carboxylic acids or amino alcohols. The products obtained are polythio mixed ethers, polythio ether esters or polythio ether ester amides, depending on the coreactants.

Suitable polyacetals include e.g. the compounds which can be prepared from glycols such as diethylene glycol, triethylene glycol, 4,4'-diethoxy-diphenyl-dimethyl methane, hexane diol and formaldehyde. Polyacetals suitable for the purpose of the invention may also be prepared by the polymerization of cyclic acetals.

Suitable polycarbonates with hydroxyl groups include those of known type which may be prepared, for example, by the reaction of diols such as propane diol-(1,3), butane diol-(1,4) and/or hexane diol-(1,6), diethylene glycol, triethylene glycol or tetraethylene glycol with phosgene or diaryl carbonates such as diphenyl carbonate.

Suitable polyester amides and polyamides include the predominantly linear condensates obtained from polyvalent saturated or unsaturated carboxylic acids or their anhydrides and polyvalent saturated or unsaturated amino alcohols, diamines, polyamines or mixtures thereof. Polyhydroxyl compounds already containing urethane or urea groups may also be used.

Low molecular weight polyols may also be used as all or part of the hydroxyl compounds, e.g. ethane diol, propane diol-(1,2) and -(1,3), butane diol-(1,4) and -(1,3), pentane diols, hexane diols, trimethylol propane, hexane triols, glycerol and pentaerythritol. Small quantities of monofunctional alcohols may also be used, e.g. stearyl alcohol.

Representatives of the above mentioned polyisocyanate and hydroxyl compounds suitable for the process according to the invention are described, for example, in High Polymers, Volume XVI, "Polyurethanes, Chemistry and Technology" by Saunders-Frisch, Interscience Publishers, New York, London, Volume I, 1962, pages 32 to 42 and pages 44 to 54 and Volume II, 1964, pages 5 to 6 and 198 to 199, and in Kunststoff-Handbuch, Volume VII, Vieweg-Hochtlen, Carl-Hanser-Verlag, Munich, 1966, e.g. on pages 45 to 71.

Chain lengthening agents with a molecular weight below 300 which may be used in the process according to the invention for the preparation of the self dispersible polyurethanes include the low molecular weight diols described for the preparation of the dihydroxy polyesters, diamines such as diamino ethane N,N'-dimethyl-diamino ethane, 1,6-diamino hexane, piperazine, 2,5-dimethyl piperazine, 1-amino-3-aminomethyl-3,5,5-trimethyl-cyclohexane, 4,4'-diaminodicyclohexylmethane, 1,4-diaminocyclohexane or 1,2-propylenediamine as well as hydrazine, amino acid hydrazides, hydrazides of semicarbazido carboxylic acids, bis-hydrazides and biss semicarbazides.

Chain breaking agents with a molecular weight below 300 include monofunctional alcohols such as methanol, ethanol, n-octanol or n-dodecanol or especially ammonia or primary amines, as described, for example, in DE-A-2,637,690.

In a preferred embodiment, the prepolymers prepared according to the invention contain terminally or laterally incorporated hydrophilic ethylene oxide units in amounts of up to about 15% by weight. The compounds b3) used for introduction of these ethylene oxide units include monoisocyanates containing terminal ethylene oxide units, diisocyanates containing lateral ethylene oxide units and/or compounds containing isocyanate-reactive groups which are monofunctional or difunctional in isocyanate polyaddition reactions and contain terminal or lateral ethylene oxide units, for example as described in DE-OS 2,314,512, DE-OS 2,314,513, DE-OS 2,551,094, DE-OS 2,651,506, U.S. Pat. No. 3,920,598 or U.S. Pat. No. 3,905,929 or mixtures of these compounds.

Preferred starting components b3) containing nonionic hydrophilic groups include compounds of the formula:

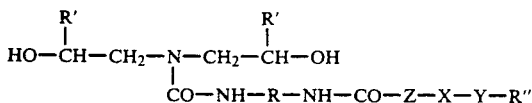

(I)

and/or compounds of the following formula:

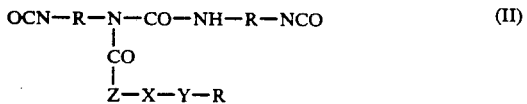

(II)

particularly preferred starting components b3) are those of the first mentioned formula (I).

In the above formulae (I) and (II)

R stands for a divalent group obtainable by removal of the isocyanate groups from a diisocyanate of the above mentioned type corresponding to the formula $R(NCO)_2$, R' stands for hydrogen or a monovalent hydrocarbon group with 1 to 8 carbon atoms, preferably hydrogen or a methyl group, R" stands for a monovalent hydrocarbon group with 1 to 12 carbon atoms, preferably an unsubstituted alkyl group with 1 to 4 carbon atoms, X stands for a polyalkylene oxide chain having 5 to 90, preferably 20 to 70 chain members, at least about 40% of which, preferably at least about 65%, are based on ethylene oxide units, the remainder based on propylene oxide, butylene oxide or styrene oxide units in addition to the ethylene oxide units, propylene oxide units being preferred among the last mentioned units.

Y for oxygen or —NR'"—wherein R'" has the same meaning as R" and

Z stands for a group which has the same meaning as Y but may in addition represent NH.

The compounds corresponding to the above mentioned formulae (I) and (II) may be prepared by the processes according to DT-OS 2,314,512 or 2,314,513 but it should be noted in addition to what is disclosed in the said documents that instead of the monofunctional polyether alcohols mentioned there as starting materials there may also be used compounds in which the polyether segment contains not only ethylene oxide units but also up to 60% by weight, based on the polyether segment, of propylene oxide, butylene oxide or styrene oxide units, preferably propylene oxide units. The presence of such "mixed polyether segments" may in special cases afford specific advantages.

Other preferred hydrophilic components to be incorporated which contain terminal or lateral ethylene oxide units are compounds of the general formula

H—Y'—X—Y—R"

and/or compounds of the general formula

OCN—R—NH—CO—Z—X—R"

wherein

X, Y, Z, R and R" have the meanings defined above and

Y' corresponds to the definition of Y but may in addition stand for NH.

Monofunctional polyethers are preferably used, but preferably only in molar quantities 10% of the quantity of polyisocyanate used to ensure the build up of high molecular weights of the polyurethane.

When relatively large quantities of monofunctional polyethers containing ethylene oxide groups are used, it may be advantageous also to include compounds which are trifunctional in isocyanate addition reactions.

The monofunctional, hydrophilic components are prepared according to the process described in U.S. Pat. Nos. 3,905,929 and 3,920,598 of alkoxylating monofunctional starting compounds such as n-butanol with ethylene oxide and optionally other alkylene oxides such as propylene oxide. The resulting product may be further modified by reaction with an excess of diisocyanate or by a reaction with ammonia resulting in the formation of the corresponding primary amino polyethers.

The proportion of anionic or potential ionic groups present is calculated to provide about 0.5 to 50 milliequivalents, preferably about 0.5 to 30 milliequivalents and more preferably about 0.5 to 20 milliequivalents of these groups per 100 g of solids. The proportion of incorporated hydrophilic ethylene oxide units may be about 0 to 15% by weight, preferably 0.8 to 10% by weight and more preferably about 1.0 to 6% by weight, based on the prepolymer solids content.

The isocyanate-terminated prepolymers according to the invention are prepared by a multi-stage process. In the first step of the process, the polyisocyanate is reacted with the whole quantity or at least a portion of starting component b1) which contains ionic groups or potentially ionic groups. The reaction temperature is preferably kept below about 150° C., preferably about 50 to 130° C. In accordance with the present invention at least 50%, preferably at least 65%, more preferably at least 80% and most preferably 100% of the isocyanate-reactive groups of component b1) are reacted with the polyisocyanate before the addition of component b2) and optional component b3). In the subsequent step(s) of preparation of the prepolymer, isocyanate-reactive components b2) and optionally b3) are reacted with the product of the first reaction stage. The equivalent ratio of isocyanate groups to isocyanate-reactive groups is preferably about 1.1:3, more preferably about 1.2:2 and most preferably about 1.2:1.8. If the organic isocyanate is reacted with all the isocyanatereactive compounds b1), b2) and b3) at the same time, the products obtained are inferior in their properties compared with those obtained by the process according to the invention, as can be seen from the stability of the dispersion or the particle size.

The reaction for the preparation of the prepolymers is preferably continued until the free isocyanate group content is equal to the theoretical value or slightly below it. The resulting prepolymer should contain about 1 to 8% by weight of free isocyanate groups, preferably about 1 to 5% by weight. The isocyanate polyaddition reaction may be carried out in the presence of catalysts such as organo tin compounds, tertiary amines, etc. although the reaction is preferably carried out without catalysts.

The prepolymers may be prepared in the presence or absence of solvents. Examples of suitable organic solvents which are inert towards isocyanate groups include dimethyl formamide, esters, ethers, ketoesters, ketones such as methylethyl ketone or acetone, glycol ether esters, chlorinated hydrocarbons, aliphatic and alicyclic pyrrolidones substituted with hydrocarbons such as N-methyl-2-pyrrolidone, hydrogenated furans, aromatic hydrocarbons and mixtures thereof. Although it is not necessary to use solvents in the preparation of the prepolymer, solvents may be helpful in keeping the reactants in the liquid phase and improving the control of the reaction temperature. The quantity of the solvent optionally used may vary over a wide range but should be sufficient to ensure that the viscosity of the prepolymer will be low enough to enable the polyurethane dispersions according to the invention to be formed, although successful dispersion may be achieved with relatively high viscosities of the prepolymer or prepolymer solution at the dispersion temperature. Viscosities below 100 centipoise may be employed; however, viscosities above 10,000 centipoise are also suitable for obtaining stable dispersions with only mild stirring. If solvents are used, they are in most cases added in quantities of about 0.01 to 10 parts by weight, preferably about 0.02 to 2 parts by weight, based on the weight of the prepolymer. The presence of solvents in the prepolymer or in the polyurethane is not necessary for obtaining stable, aqueous dispersions. When solvents are used for the preparation of the prepolymer and/or of the polyurethane, it is in many cases desirable to remove at least part of the solvent from the aqueous dispersion. The solvent used should preferably have a lower boiling point than water so that it can be removed from the aqueous dispersion, for example by distillation. Removal of the low boiling solvent should be carried out under mild conditions which will not damage the polyurethane. If solvents with boiling points higher than that of water are used such as dimethyl formamide or N-methyl pyrrolidone, they remain in the aqueous polyurethane dispersion. They accelerate coalescence of the polyurethane particles during film formation.

When potential ionic groups are incorporated in the polyaddition product, they are converted into ionic groups in a known manner by neutralization.

When potential anionic groups of the prepolymer are neutralized, the prepolymer becomes hydrophilic and can be converted into a stable dispersion. The potential or unneutralized anionic groups are not sufficiently hydrophilic for the formation of stable dispersions. It is therefore necessary to neutralize a sufficient quantity of potential anionic groups so that in combination with any nonionic hydrophilic groups optionally used, they will ensure the formation of stable aqueous dispersions. In general, at least about 50%, preferably at least about 80% of the potential anionic groups are converted into anionic groups by neutralization. Although higher proportions of potentially anionic groups may be left unneutralized, these unneutralized groups provide no advantage and may reduce the improvement in resistance to hydrolysis provided according to the invention. If only small quantities of potential anionic groups are incorporated in the molecule, it may be necessary to neutralize all these groups in order to render the compounds sufficiently hydrophilic.

The step of neutralization may be carried out
1. before prepolymer formation, by treating the compounds containing the potential ionic groups,
2. after prepolymer formation but before dispersion of the prepolymer or
3. during dispersion, by adding the neutralizing agent to all or part of the water used for dispersion.

The reaction between the neutralizing agent and the potential anionic groups may be carried out at temperatures of about 20° C. to 150° C., preferably below about 100° C., more preferably about 30° C. to 80° C.

Suitable neutralizing agents for the process according to the invention are set forth, for example, in U.S. Pat. No. 3,479,310.

Conversion of the isocyanate-terminated prepolymers into aqueous dispersions is carried out by known methods of polyurethane chemistry. When water is added to the hydrophilic prepolymer, the organic prepolymer is initially the continuous phase and there is a marked rise in viscosity. As water continues to be added, a phase reversal takes place and water becomes the continuous phase and the viscosity falls. If neutralizing agents are used in the water of dispersion, a sufficient quantity of anionic groups must be present in combination with the hydrophilic ethylene oxide units during the phase reversal to form stable aqueous dispersions. This may be achieved by adding the total quantity of neutralizing agent to a proportion of the water of dispersion which is not sufficient to lead to phase reversal and then adding the remainder of the water.

No marked increase in viscosity takes place if the prepolymer is added to the water of dispersion. The prepolymer is generally added with stirring in small portions to the water of dispersion which may contain neutralizing agent, optionally using mechanical mixing apparatus in a continuous process. If low boiling solvents have been used for the preparation of the prepolymer, these may be removed before dispersion is carried out but it is preferable to remove the solvent after dispersion since the presence of solvent facilitates the formation of the dispersion and chain lengthening.

If chain lengthening takes place in the aqueous medium, the chain lengthening agent which contains amino groups should be added before the free isocyanate groups have undergone any marked reaction with water. Chain lengthening is generally carried out within 30 minutes, preferably 15 minutes after the addition of water, depending upon the temperature.

The amines used for chain lengthening of the isocyanate-terminated prepolymers which are dispersed in water may have average functionalities of from 2 to 6, preferably from 2 to 4 and most preferably from 2 to 3, the average functionality being the average number of amino groups per molecule. The desired functionalities may be obtained by mixing different amines.

Suitable amines are in particular hydrocarbons having 2 to 6 amine groups containing isocyanate-reactive groups. The polyamines are generally aromatic, aliphatic or alicyclic and contain 1 to 30 carbon atoms, preferably 2 to 15 carbon atoms and most preferably 2 to 10 carbon atoms. These polyamines may also contain other substituents, provided they are not isocyanate-reactive groups. Examples of polyamines which are suitable for the purpose of the present invention include those previously mentioned as chain lengthening agents and also diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'-tris-(2-aminoethyl)-ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N- (2-piperazinoethyl)-amine, N,N-bis-(2-piperazinoethyl)-amine, polyethylene imines, imino-bis-propylamine, guanidine, melamine, N-(2-aminoethyl)-1,3-propane-diamine, 3,3'-diaminobenzidine, 2,4,6-triaminopyrimidine, polyoxypropylene amines, tetrapropylene pentamine, tripropylenetetramine, N,N-bis-(6-aminohexyl)amine, N,N'-bis-(3-aminopropyl)-ethylene diamine and 2,4-bis-(4'-aminobenzyl)-aniline. Preferred polyamines include 1-amino-3-aminomethyl-3,5,5-trimethylcyclohexane (isophorone diamines or IPDA), bis-(4-aminocyclohexyl)-methane, bis-(4-amino-3-methyl-cyclohexyl)-methane, 1,6-diaminohexane, ethylene diamine, diethylene triamine, triethylene tetramine, tetraethylene pentamine, N,N'-dimethyl-ethylene diamine, N-methyl-ethylene diamine and pentaethylene hexamine.

In addition to the above mentioned amines in which all the isocyanate-reactive components are amine groups, it is s also suitable to use amines which contain other nonionic isocyanate-reactive groups in addition to the amine groups, e.g. ethanolamine, diethanolamine, 2-amino-2-hydroxymethyl-1,3-propane diol or N-(2-amino-ethyl)-ethanolamine.

The quantity of polyamine to be used depends on the terminal isocyanate group content of the prepolymer. The ratio of milliequivalents of isocyanate end groups in the prepolymer to amino groups in the polyfunctional amine is generally in the range of about 1.0:0.20 to about 1.0:1.1, preferably about 1.0:0.3 to 1.0:0.98. The reaction between isocyanate end groups and polyamines is carried out at temperatures of about 5 to 90° C., preferably about 20 to 80° C. The polyamine may be added to the dispersion of prepolymer in water either as the pure substance or diluted with water or suitable organic solvents such as those already described above for the preparation of the prepolymer.

The polyurethane dispersions prepared by the process described above may be modified with isocyanates after formation of the dispersion, as described in DOS 2,708,442.

Polyisocyanate compounds containing at least two free isocyanate groups may be added to the solutions and dispersions according to the invention before use.

Polyisocyanate compounds which can be emulsified in water are particularly preferred. These include, for example, the compounds described in EP 206,059 and DE-OS 3,112,117 (which correspond to U.S. Pat. Nos. 4,663,377 and 4,433,095, respectively, herein incorporated by reference in their entireties). The polyisocyanate compounds are put into the process in a quantity of about 0.1 to 20% by weight, preferably about 0.5 to 10% by weight, most preferably about 1.5 to 6% by weight, based on the solution or dispersion. This addition results in a considerable improvement in the heat strength of adhesive bonds which have been prepared from the solutions or dispersions according to the invention.

The product finally obtained is a stable, aqueous polyurethane dispersion having a solids content of up to about 60% by weight, most preferably about 25 to 50% by weight. The dispersions may be further diluted in any proportion. The particle diameter is generally below 1 $\mu$m, preferably about 0.001 to 0.5 $\mu$m. The average particle diameter should be below 0.5 $\mu$m, preferably about 0.01 to 0.3 $\mu$m.

When the hydrophilic group content is very low, average particle diameters of about 5 $\mu$m to 50 $\mu$m may be obtained. Such dispersions are of interest, for example, for the preparation of polyurethane powders.

The dispersions may be blended with other dispersions, e.g. with polyvinyl acetate or with dispersions of polyethylene, polystyrene, polybutadiene, polyvinyl chloride, polyacrylate or copolymer plastics dispersions. Known emulsifiers which are not chemically fixed, particularly ionic emulsifiers, may also be added but are, of course, not necessary.

Fillers, plasticizers, pigments, carbon black and silica sols and dispersions of aluminium, clay or asbestos may also be incorporated in the dispersions.

The dispersions of the polyurethane compositions in water are in most cases stable and suitable for storage and transport and may be worked up at any later date, e.g. by a molding or shaping process. They generally dry directly to form dimensionally stable plastic coatings but the products of the process may also be given their final form in the presence of known cross-linking agents. The polyurethanes obtained vary in their properties according to the selected chemical composition and the urethane group content. Thus soft, sticky masses and thermoplastic and rubbery elastic properties may be obtained over a wide range of hardness up to glass hard duroplasts. The hydrophilic character of the products may also vary within certain limits. The elastic products may be processed thermoplastically at elevated temperatures, for example at about 100 to 180° C., if they have not been chemically cross-linked.

The products of the process are suitable for coating and impregnating woven and non-woven textiles, leather, paper, wood, metals, ceramics, stone, concrete, bitumen, hard fibers, straw, glass, porcelain, plastics of a variety of different types, glass fibers for antistatic and crease resistant finishes; as binders for non-woven, adhesives, adhesion promotors, laminating agents, hydrophobicizing agents, plasticizers and binders, e.g. for cork powder or sawdust, glass fibers, asbestos, paper-like materials, plastics or rubber waste and ceramic materials; as auxiliary agents in textile printing and in the paper industry; as additives for polymers; as sizing agents, for example for glass fibers; and for finishing leather.

The products are preferably applied as dispersions or pastes to a porous support which subsequently remains joined to the finished product, e.g. woven or non-woven textiles or fiber mats, felts or fleeces; also paper fleeces, foam films or split leather which produce instant solidification of the coating due to their suction effect. The product is subsequently dried at an elevated temperature and optionally pressed. Drying may also be carried out on smooth, porous or non-porous materials such as metals, glass, paper, cardboard, ceramic materials, sheet steel, silicone rubber or aluminium foil. The sheet-like structure obtained is subsequently lifted off and used as such or applied to a substrate by gluing, flame laminating or calandering, employing the reversal process. Application by the reversal process may be carried out at any time.

The properties of the products of this process may be modified by using vinyl polymers or active or inactive fillers. The following, for example, may be used: polyethylene, polypropylene, polyvinyl acetate, ethylene/vinyl acetate copolymers which are optionally (partly) saponified and/or grafted with vinyl chloride, styrene/butadiene copolymers, ethylene (graft) copolymers, polyacrylates, carbon black, silica, asbestos, talcum, kaolin, titanium dioxide, glass powder, or glass in the form of fibers, and cellulose. The end product may contain up to about 70% of such fillers, based on the total dry substance content, depending on the required properties and the purpose for which the products are to be used.

Dyes, pigments, plasticizers and additives which influence the flow properties may, of course, also be added.

Drying of the products may be carried out at room temperature or elevated temperature. The drying temperature to be chosen in any given case depends not only on the chemical composition of the material but also on the moisture content, the drying time and the thickness of the layer and is easily determined by a preliminary test. At the given heating time, the drying temperature must always be below the solidification temperature.

The sheet structures may subsequently be covered with a finish to increase the resistance of their surface. Aqueous dispersions or solutions are also preferably used for this purpose.

Very hard polyurethanes obtained from finely divided dispersions and sols are suitable for use as storing lacquers and in some cases even as air drying lacquers. They combine great hardness and elasticity with a high gloss and, when used with aliphatic diisocyanates, have good light resistance and weather resistance.

The examples given below serve to illustrate the composition and preparation and some of the physical properties of the products.

The parts given in the examples are parts by weight. Two criteria are employed for assessing the quality of the dispersions:
1. Particle size from dynamic light scattering
2. Stability to centrifuging (15 minutes at 4500 revs per min). The assessment ranges from 1 (no formation of sediment) to 6 (completely sedimented).

EXAMPLES

Example 1

In the first step of preparation of the prepolymer, 80 parts of a propoxylated adduct of 2-butene diol-(1,4) and $NaHSO_3$ (molecular weight 430) in the form of a 70% solution in toluene (diol sulphonate) were reacted with 88.6 parts of isophorone diisocyanate (IPDI) and 33.6 parts of hexamethylene diisocyanate (HDI) at 90° C. within 1.6 hours. A reaction product having an isocyanate content of 19.1% was obtained.

In the second step of preparation of the prepolymer, 116.7 parts of the reaction product from the first reaction step were reacted with 400 parts of a previously dehydrated polyester of adipic acid and butane diol-(1,4) (molecular weight 2250) for 2 hours at 100° C. A constant NCO value of 2.6% was established. The prepolymer was then cooled to 70° C.

453 parts of the prepolymer, which had been prepared by a multi-stage process, were dispersed in 600 parts of water (heated to 50° C.) with vigorous stirring. A solution of 6.0 parts of ethylene diamine in 100 parts of water was added as chain lengthening agent over a period of 5 minutes at 50° C. and the reaction mixture was then stirred for about 2 hours.

A finely divided dispersion having a solids content of 43.4% by weight and a viscosity of 280 cP was obtained. The content of $SO^{\ominus}_3$ groups was 1.5% by weight, based on the solids content. The particle size was 185 nm and the stability to centrifuging was 1.

Example 2

(comparison example to Example 1)

A prepolymer having the same composition as in Example 1 was prepared from the same stirring components by reacting the polyester, the diol sulphonate, IPDI and HDI together in a single step at 100° C. A constant NCO value of 2.9% was established. The prepolymer was then cooled to 70° C.

490 parts of the prepolymer which had been prepared in a single stage were dispersed in 600 parts of water (50° C.) with vigorous stirring. A solution of 7.0 parts of ethylene diamine in 150 parts of water was added over a period of 5 minutes at 50° C. for chain lengthening and the reaction mixture was then stirred for about 2 hours.

No stable dispersion was obtained under these conditions.

Example 3

In the first step of preparation of the prepolymer, 50 parts of the diol sulphonate from Example 1 were reacted with 145 parts of dicyclohexyl methane-4,4'-diisocyanate in 32.5 parts of N-methyl-pyrrolidone (NMP) within 1 hour at 90° C. A reaction product having an isocyanate content of 16.7% was obtained.

In the second step of preparation of the prepolymer, 194 parts of the reaction product from the first reaction step were reacted at 100 to 120° C. for 5 hours with 400 parts of a previously dehydrated adipic acid/butane diol-(1,4) polyester (molecular weight 2250), 28 parts of a polyethylene oxide/polypropylene oxide polyether started on n-butanol (molecular weight 2145; molar ratio ethylene oxide: propylene oxide 83:17) and 16 parts of a propylene oxide ether (OH number 197) which has been started on bisphenol A. A constant NCO value of 2.1% was established. The prepolymer was then cooled to 70° C.

545 parts of this prepolymer, which had been prepared by a multi-stage process, were dispersed in 600 parts of water (35° C.) with vigorous stirring. A solution of 5.9 parts of ethylene diamine in 220 parts of water was added over a period of 5 minutes at 50° C. for chain lengthening and the reaction mixture was then stirred for 2 hours.

A finely divided dispersion having a solids content of 37.8% by weight and a viscosity of 23.4 cP was obtained. The $SO^{\ominus}_3$ group content was 0.9% by weight, based on the solids content. The particle size was 208 nm and the stability to ntrifuging was 2.

Example 4

(comparison example to Example 3)

A prepolymer having the same composition as in Example 3 was prepared from the same starting components by reacting the polyester, the diol sulphonate, the diisocyanate and the two polyethers together in one step at 100° C. A constant NCO value of 2.1% was established. The prepolymer was then cooled to 70° C.

527 parts of the prepolymer which had been prepared in a single stage were dispersed in 600 parts of water (35° C.) with vigorous stirring. A solution of 5.5 parts of ethylene diamine in 200 parts of water was added over a period of 5 minutes at 50° C. for chain lengthening and the reaction mixture was then stirred for about 2 hours.

A coarse dispersion having a solids content of 38.5% by weight and a viscosity of 14 cP was obtained. The $SO^{\ominus}_3$ group content was 0.9% by weight, based on the solids content. The particle size was 268 nm and the stability to centrifuging was 3 to 4.

Example 5

In the first step of preparation of the prepolymer, 43 parts of the diol sulphonate from Example 1 in 27.8 parts of N-methylpyrrolidone were added dropwise to 87.7 parts of toluylene diisocyanate (2,4:2,6 isomeric ratio 80:20) and 0.4 parts of p-toluene sulphonic acid at a reaction temperature of 50° C.

A reaction product having an isocyanate content of 22.3% was obtained.

In the second step of preparation of the prepolymer, 137 parts of the reaction product from the first reaction step were reacted at 80° C. for 2 hours with 400 parts of a previously dehydrated polyester of adipic acid and butane diol-(1,4) (molecular weight 2250), 28 parts of a polyethylene oxide/polypropylene oxide polyether started on n-butanol (molecular weight 2145; molar ratio ethylene oxide:propylene oxide 83:17) and 16 parts of a propylene oxide ether (OH number 197) which has been started on bisphenol A. A constant isocyanate value of 1.8% was established. The prepolymer was then cooled to 70° C.

513 parts of this prepolymer which had been prepared by a multi-stage process were dispersed in 600 parts of water (38° C.) with vigorous stirring. A solution of 4.7 parts of ethylene diamine in 150 parts of water were added over a period of 5 minutes at 50° C. for chain lengthening and the reaction mixture was then stirred for about 2 hours.

A finely divided dispersion having a solids content of 41.9% by weight and a viscosity of 84 cP was obtained. The $SO^\ominus_3$ group content was 0.8% by weight, based on the solids content. The particle size was 194 nm and the stability to centrifuging was 1.

Example 6

(comparison example to Example 5)

A prepolymer having the same composition as in Example 5 was prepared from the same starting components by reacting the polyester, the diol sulphonate, the diisocyanate and the two polyethers together in one step at 100° C. A constant NCO value of 1.6% was established. The prepolymer was then cooled to 70° C.

500 parts of this prepolymer prepared by the single stage process were dispersed in 600 parts of water (35° C.) with vigorous stirring. A solution of 3.9 parts of ethylene diamine in 150 parts of water was added over a period of 5 minutes at 50° C. for chain lengthening and the reaction mixture was then stirred for about 2 hours.

A coarse dispersion having a solids content of 38.8% by weight was obtained. The $SO^\ominus_3$ group content was 0.8% by weight, based on the solids content. The particle size was 294 nm and the stability to centrifuging was 5 to 6.

Example 7

In the first step of preparation of the prepolymer, 43 parts of the diol sulphonate from Example 1 in 74.5 parts of isophorone diisocyanate and 28.2 parts of hexamethylene diisocyanate were reacted together at a reaction temperature of 80° C. A reaction product having an isocyanate content of 24.8% was obtained.

In the second step of preparation of the prepolymer, 119 parts of the reaction product from the first reaction step were reacted for 3 hours at 95° C. with 400 parts of a previously dehydrated polyester of adipic acid and butane diol-(1,4) (molecular weight 2250), 28 parts of a polyethylene oxide/polypropylene oxide polyether started on n-butanol (molecular weight 2145; molar ratio ethylene oxide:propylene oxide 83:17) and 16 parts of a propylene oxide ether (OH number 197) which had been started on bisphenol A. A constant NCO value of 1.5% was established. The prepolymer was then cooled to 70° C.

500 parts of this prepolymer prepared by a multi-stage process were dispersed in 600 parts of water (50° C.) with vigorous stirring. A solution of 3.7 parts of ethylene diamine in 150 parts of water was added over a period of 5 minutes at 50° C. for chain lengthening and the reaction mixture was then stirred for about 2 hours.

A finely divided dispersion having a solids content of 40.8% by weight and a viscosity of 1122 cP was obtained. The $SO^\ominus_3$ group content was 0.8% by weight, based on the solids content. The particle size was 136 nm and the stability to centrifuging was 1.

Example 8

(comparison example to Example 7)

A prepolymer having the same composition as in Example 7 was prepared from the same starting components by reacting the polyester, the diol sulphonate, the diisocyanates and the two polyethers together in one step at 95° C. A constant NCO value of 1.7% was established. The prepolymer was then cooled to 70° C.

500 parts of this prepolymer prepared by a single stage process were dispersed in 650 parts of water (50° C.) with vigorous stirring. A solution of 4.2 parts of ethylene diamine in 100 parts of water was added over a period of 5 minutes at 50° C. for chain lengthening and the reaction mixture was then stirred for about 2 hours.

A coarse dispersion having a solids content of 41% by weight and a viscosity of 91 cP was obtained. The $SO^\ominus_3$ group content was 0.8% by weight, based on the solids content. The particle size was 184 nm and the stability to centrifuging was 1 to 2.

Example 9

In the first step of preparation of the prepolymer, 92.5 parts of the diol sulphonate from Example 1 were reacted with 157.5 parts of isophorone diisocyanate at a reaction temperature of 100° C. A reaction product having an isocyanate content of 18.7% was obtained.

In the second stage of preparation of the prepolymer, 203 parts of the reaction product from the first reaction step were reacted at 100° C. for 4 hours with 400 parts of a previously dehydrated polyester of adipic acid and butane diol-(1,4) (molecular weight 2250), 28 parts of a polyethylene oxide/polypropylene oxide polyether started on n-butanol (molecular weight 2145; molar ratio ethylene oxide: propylene oxide 83:17) and 16 parts of a propylene oxide ether (OH number 197) which had been started on bisphenol A. A constant NCO value of 3.2% was established. The prepolymer was then cooled to 70° C.

545 parts of this prepolymer prepared by a multi-stage process were dispersed in 600 parts of water (50° C.) with vigorous stirring. A solution of 8.7 parts of ethylene diamine in 100 parts of water were added over a period of 5 minutes at 50° C. for chain lengthening and the reaction mixture was then stirred for about 2 hours.

A finely divided dispersion having a solids content of 45.6% by weight was obtained. The $SO^\ominus_3$ group content was 1.5% by weight, based on the solids content. The particle size was 87 nm and the stability to centrifuging was 1.

Example 10

(comparison example to Example 9)

A prepolymer having the same composition as in Example 9 was prepared from the same starting components by reacting the polyester, the diol sulphonate, the diisocyanate and the two polyethers together in one step at 110° C. A constant NCO value of 3.2% was established. The prepolymer was then cooled to 70° C.

580 parts of this prepolymer prepared in a single stage were dispersed in 650 parts of water (50° C.) with vigorous stirring. A solution of 9.2 parts of ethylene diamine in 220 parts of water was added over a period of 5 minutes at 50° C. for chain lengthening and the reaction mixture was then stirred for about 2 hours.

A coarse dispersion having a solids content of 42% by weight was obtained. The $SO^\ominus_3$ group content was 1.5% by weight, based on the solids content. The particle size was 138 nm and the stability to centrifuging was 1.

Example 11

In the first step of preparation of the prepolymer, 70 parts of the diol sulphonate from Example 1 were reacted with 190 parts of isophorone diisocyanate for 4 hours at a reaction temperature of 120° C. A reaction product having an isocyanate content of 24.2% was obtained.

In the second step of preparation of the prepolymer, 209 parts of the reaction product from the first reaction step were reacted at 100° C. for 3 hours with 400 parts of a previously dehydrated polyester of adipic acid and butane diol-(1,4) (molecular weight 2250) and 12 parts of butane diol-(1,4). A constant NCO value of 3.8% was established. The prepolymer was then cooled to 70° C.

540 parts of this prepolymer prepared by a multi-stage process were dispersed in 600 parts of water (50° C.) with vigorous stirring. A solution of 10.2 parts of ethylene diamine in 150 parts of water was added over a period of 5 minutes at 50° C. for chain lengthening and the reaction mixture was then stirred for about 2 hours.

A finely divided dispersion having a solids content of 41.6% by weight was obtained. The $SO^\ominus_3$ group content was 1.2% by weight, based on the solids content. The particle size was 104 nm and the stability to centrifuging was 1.

Example 12

(comparison example to Example 11)

A prepolymer having the same composition as in Example 11 was prepared from the same starting components by reacting the polyester, the diol sulphonate, the diisocyanate and butane diol-(1,4) together in one step at 110° C. A constant NCO value of 4.0% was established. The prepolymer was then cooled to 70° C.

534 parts of this prepolymer prepared by a single stage process were dispersed in 650 parts of water (50° C.) with vigorous stirring. A solution of 10.6 parts of ethylene diamine in 150 parts of water was added over a period of 5 minutes at 50° C. for chain lengthening and the reaction mixture was then stirred for about 2 hours.

A coarse dispersion having a solids content of 43.7% by weight was obtained. The $SO^\ominus_3$ group content was 1.2% by weight, based on the solids content. The particle size was 217 nm and the stability to centrifuging was 2.

Example 13

In the first step of preparation of the prepolymer, 45 parts of the diol sulphonate from Example 1 were reacted with 116.7 parts of isophorone diisocyanate and 37.9 parts of hexamethylene diisocyanate for 1.5 hours at a reaction temperature of 90° C. A reaction product having an isocyanate content of 28.5% was obtained.

In the second step of preparation of the prepolymer, 160 parts of the reaction product from the first reaction step were reacted at 100° C. for 4 hours with 400 parts of a previously dehydrated polyester of adipic acid/hexane diol-(1,6)/neopentyl glycol (ratio of glycols 65:35, molecular weight 1700) and 28 parts of a polyethylene oxide/polypropylene oxide polyester started on n-butanol (molecular weight 2145; molar ratio of ethylene oxide to propylene oxide 83:17). A constant NCO value of 4.1% was established. The prepolymer was then cooled to 70° C.

520 parts of this prepolymer prepared by a multi-stage process were dispersed in 600 parts of water (50° C.) with vigorous stirring. A solution of 32.8 parts of isophorone diamine in 180 parts of water was added over a period of 5 minutes at 50° C. for chain lengthening and the reaction mixture was then stirred for about 2 hours.

A finely divided dispersion having a solids content of 45% by weight and a viscosity of 60 cP was obtained. The $SO^\ominus_3$ group content was 0.8% by weight, based on the solids content. The particle size was 259 nm and the stability to centrifuging was 1.

Example 14

(comparison example to Example 13)

A prepolymer having the same composition as in Example 13 was prepared from the same starting components by reacting the polyester, the diol sulphonate, the diisocyanate and the polyether together in one step at 95° C. A constant NCO value of 4.1% was established. The prepolymer was then cooled to 70° C.

515 parts of this prepolymer prepared by a single stage process were dispersed in 600 parts of water (50° C.) with vigorous stirring. A solution of 32 parts of isophorone diamine in 180 parts of water was added over a period of 5 minutes at 50° C. for chain lengthening and the reaction mixture was then stirred for about 2 hours.

A coarse dispersion having a solids content of 42.8% by weight was obtained. The $SO^\ominus_3$ group content was 0.8% by weight, based on the solids content. The particle size was 325 nm and the stability to centrifuging was 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a stable polyurethane-polyurea dispersion in a multi-stage process which comprises forming an isocyanate-terminated prepolymer having an ionic group content of up to about 50 milliequivalents per 100 g of solids by
   1) reacting an organic polyisocyanate (a) with a compound b1) having at least two isocyanate-reactive groups and at least one onic or potential ionic hydrophilic group for a time sufficient to react at least 50% of the isocyanate-reactive groups of compound b1)

2) reacting the resulting product with a compound b2) which contains at least two isocyanate-reactive groups and has a molecular weight of 300 to about 6000 and does not contain at least one ionic or potential ionic hydrophilic group and optionally a compound b3) containing at least one isocyanate-reactive group and hydrophilic ethylene oxide units in a terminal and/or lateral position to form a prepolymer and 3) dispersing said prepolymer in water.

2. The process of claim 1, wherein the prepolymer is a straight chain prepolymer having a molecular weight of up to about 25,000.

3. The process of claim 1 which comprises reacting said prepolymer with a chain lengthening agent having a molecular weight below 300 during or after dispersing the prepolymer in water.

4. The process of claim 1 wherein component b2) has a molecular weight of about 1500 to 5000.

5. The process of claim 1 characterized in that compound b1) is a difunctional compound containing group.

6. The process of claim 1 wherein component b1) is difunctional.

7. The process of claim 1 wherein organic polyisocyanate (a) comprises a member selected from the group consisting of isophorone diisocyanate, dicylohexylmethane-4,4'diisocyanate, diisocyanate, toluene diisocyanate, diphenylmethane-4,4'-diisocyanate and hexamethylene diisocyanate, compound b1) comprises a propoxylated adduct of 2-butene diol-(1,4) and $NaHSO_3$ and compound b2) comprises a member selected from the group consisting of an adipic acid/butane diol-(1,4) polyesters, adipic acid/hexane diol-(1,6) polyesters and adipic acid/hexane diol-(1,6)/neopentyl glycol polyesters.

8. The process of claim 1 wherein component b1) comprises a diol containing a sulphonic acid group which has been converted into an ionic group by neutralization before prepolymer formation.

9. The process of claim 1 wherein step 1) is conducted for a time sufficient to react at least 80% of the isocyanate-reactive groups of compound b1).

10. A stable polyurethane-polyurea dispersion which is prepared in a multi-stage process which comprises forming an isocyanate-terminated prepolymer having an ionic group content of up to about 50 milliequivalents per 100 g of solids by 1) reacting an organic polyisocyanate (a) with a compound b1) having at least two isocyanate-reactive groups and at least one ionic or potential ionic hydrophilic group for a time sufficient to react at least 50% of the isocyanate-reactive groups of compound b1)

2) reacting the resulting product with a compound b2) which contains at least two isocyanate-reactive groups and has a molecular weight of 300 to about 6000 and does not contain at least one ionic or potential ionic hydrophilic group and optionally a compound b3) containing at least one isocyanate-reactive group and hydrophilic ethylene oxide units in a terminal and/or lateral position to form a prepolymer and 3) dispersing said prepolymer in water.

11. The dispersion of claim 10, wherein the prepolymer is a straight chain prepolymer having a molecular weight of up to about 25,000.

12. The dispersion of claim 10 which comprises reacting said prepolymer with a chain lengthening agent having a molecular weight below 300 during or after dispersing the prepolymer in water.

13. The dispersion of claim 10 wherein component b2) has a molecular weight of about 1500 to 5000.

14. The dispersion of claim 10 characterized in that compound 1) is a difunctional compound containing $SO^{\ominus}_3$ group.

15. The dispersion of claim 10 wherein component b1) is difunctional.

16. The dispersion of claim 10 wherein organic polyisocyanate (a) comprises a member selected from the group consisting of isophorone diisocyanate, dicylohexylmethane-4,4'-diisocyanate, toluene diisocyanate, diphenylmethane-4,4'-diisocyanate and hexamethylene diisocyanate, compound b1) comprises a propoxylated adduct of 2-butene diol-(1,4) and $NaHSO_3$ and compound b2) comprises a member selected from the group consisting of adipic acid/butane diol-(1,4) polyesters, adipic acid/hexane diol-(1,6) polyesters and adipic acid/hexane diol-(1,6)/neopentyl glycol polyesters.

17. The dispersion of claim 10 wherein component b1) comprises a diol containing a sulphonic acid group which has been converted into an ionic group by neutralization before prepolymer formation.

18. The process of claim 10 wherein step 1) is conducted for a time sufficient to react at least 80% of the isocyanate-reactive groups of compound b1).

19. A process for the production of a coating or an adhesive which comprises coating at least one substrate with the dispersion of claim 10 and subsequently curing said coated substrate.

* * * * *

UNITED STATES PATENT AND TRADEMARK OFFICE
CERTIFICATE OF CORRECTION

PATENT NO. : 5,039,733

DATED : August 13, 1991

INVENTOR(S) : JEFFREY DORMISH, WOLFGANG HENNING

It is certified that error appears in the above-identified patent and that said Letters Patent is hereby corrected as shown below:

Title page, item [73] after Germany insert --, Mobay Corporation, Pittsburgh, Pa.--.

Signed and Sealed this

Thirtieth Day of March, 1993

Attest:

STEPHEN G. KUNIN

*Attesting Officer*  *Acting Commissioner of Patents and Trademarks*